United States Patent Office 3,755,585
Patented Aug. 28, 1973

3,755,585
METHOD OF TREATING INFLAMMATION
Henricus J. C. Tendeloo, Valkenburchtlaan 35, Oosterbeek, Frederik W. Broekman, Geertjesweg 98, Wageningen, Wouter F. H. Stroer, Graaf Willemlaan 68, Amstelveen, and Johannes J. Siemelink, Emmalaan 1, Utrecht, all of Netherlands
No Drawing. Filed Aug. 3, 1971, Ser. No. 168,765
Claims priority, application Netherlands, Aug. 7, 1970, 7011749
Int. Cl. A61k 27/00
U.S. Cl. 424—266          7 Claims

ABSTRACT OF THE DISCLOSURE

Pharmaceutical compositions comprising 4-hydroxynicotinic acid or a pharmaceutically acceptable salt thereof, useful as analgesics and antiphlogistics.

IMPROVEMENTS IN OR RELATING TO ORGANIC COMPOUNDS

This invention relates to pharmaceutical compositions.

More particularly, this invention provides a pharmaceutical composition comprising 4-hydroxynicotinic acid or a pharmaceutically acceptable salt thereof, in association with a pharmaceutically acceptable diluent or carrier.

4-hydroxynicotinic acid is known and salts thereof are known or may be produced in conventional manner. The present invention is based on the discovery that 4-hydroxynicotinic acid and pharmaceutically acceptable salts thereof, possess pharmacological activity in animals. In particular, they possess analgesic activity as indicated in mice tested according to the method of Hardy et al., J. Clin. Invest. 19, 649 (1946) as modified by Gross, Helv. Phys. Pharmacol. Acta. 5, C31 (1947), and antiphlogistic activity, as indicated in rats by the test basically described by Carl M. Pearson, J. A. Shaffer, The Mechanisms of Hypersensitivity, Boston (1959), pp. 647–671 and broadly involving the daily administration, p.o., of the test substance, for a week, then injection of Freund's adjuvant to experimentally induce arthritis, then further daily administration, p.o., of the test substance, and, periodically, the taking of blood samples and determination of the albumin and globulin content thereof. The compounds are therefore useful as analgesic and anti-phlogistic agents, for example in the treatment of rheumatism and of common cold symptoms, such as nasal congestion and hoarseness.

The dosage of active ingredient employed for such usage may vary depending on the severity of the condition being treated. However, in general, satisfactory results are obtained when the compounds are administered at a daily dosage of from about 0.1 to about 10 milligrams per kilogram of animal body weight, preferably given in divided dosages two to four times a day, or in sustained release form. For most large mammals, the total daily dosage is from 5 to 500 mg. Dosage forms suitable for internal use comprise from 1.25 to 250 mg. of the active compound in intimate admixture with a solid or liquid pharmaceutically acceptable diluent or carrier. For topical application, suitable preparations may contain from 1 to 20%, suitably 2 to 10%, by weight of the active ingredient.

As indicated, the 4-hydroxynicotinic acid may be used as such or in the form of a pharmaceutically acceptable salt, which salt forms have the same order of activity as the free acid. Suitable salts include alkali metal salts, for example the potassium or sodium salt, and the ammonium salt, and alkaline earth metal salts, e.g. the calcium salt.

The compositions may, for example, contain up to 90%, preferably at least 1%, by weight of the active ingredient, in formulations other than topical formulations.

The compositions may be administered orally, suitably in such forms as tablets, dispersible powders, granules, capsules, suspensions, syrups or elixirs, parenterally in such forms as injectable solutions or suspensions enterally in such forms as suppositories, and topically in such forms as ointments and creams. The compositions may contain one or more conventional adjuvants, such as sweetening agents, flavouring agents, colouring agents and preserving agents, in order to provide an elegant and palatable preparation. Tablets may contain the active ingredients in admixture with conventional pharmaceutical excipients, e.g. inert diluents, such as calcium carbonate, sodium carbonate, lactose and talc, granulating and disintegrating agents, e.g. starch and alginic acid, binding agents, e.g. starch, gelatine and acacia, and lubricating agents, e.g. magnesium stearate, stearic acid and talc. The tablets may be uncoated or coated by known techniques to delay disintegration and absorption in the gastro-intestinal tract and thereby provide a sustained action over a longer period. Similarly, suspensions, syrups and elixirs may contain the active ingredient in admixture with any of the conventional excipients utilised for the prepartion of such compositions, e.g. suspending agents, such as methyl cellulose, tragacanth and sodium alginate, wetting agents, such as lecithin, polyoxyethylene stearate and polyoxyethylene sorbitan mono-oleate, and preservatives, such as ethyl p-hydroxybenzoate. Capsules may contain the active ingredient admixed with an inert solid diluent, e.g. calcium carbonate, calcium phosphate and kaolin. For topical application, ointments and creams may, for example, contain the active ingredient in admixture with a pharmaceutically acceptable carrier or diluent, such as lanolin. Furthermore, 4-hydroxynicotinic acid or a pharmaceutically acceptable salt thereof may be used as such or in preparations in forms such as bath-cubes, powders, granulates or solutions, as bath additives. Sodium carbonate may suitably be incorporated into such preparations to improve solubility and dispersion of the active ingredient in the bath water.

Further examples of ingredients and formulations suitable for the compositions of the invention may be found in, for example, Nederlandse Pharmacopee, 6th edition, e.g. pp. 560–562, 596 and 597 (1958).

The preferred pharmaceutical compositions from the standpoint of preparation and ease of administration are tablets or capsules containing from about 10 to about 100 mg. of active ingredient.

The following examples illustrate the invention.

EXAMPLE 1

Ointment or cream

Ointments or cream, indicated for local topical administration or the treatment of common cold symptoms, such as nasal congestion and hoarseness, and of rheumatic pains, and containing the following ingredients, may be produced in conventional manner.

| Ingredient: | Weight (g.) |
|---|---|
| 4-hydroxynicotinic acid | 2.5 or 5 |
| Lanolin | 100 |

EXAMPLE 2

Tablets

Tablets suitable for oral administration and containing the following ingredients, may be prepared in conventional manner. Such tablets are indicated for use in the treatment of rheumatic pains, at a dosage of 1 tablet two to four times a day.

| Ingredient: | Weight (mg.) |
|---|---|
| 4-hydroxynicotinic acid | 30 |
| Tragacanth | 10 |
| Lactose | 217.5 |
| Corn starch | 25 |
| Talcum | 15 |
| Magnesium stearate | 2.5 |

What is claimed is:

1. A method of treating inflammation, comprising orally, enterally or parenterally administering to a mammal in need of said treatment, an anti-inflammatory effective amount of 4-hydroxynicotinic acid or a pharmaceutically acceptable salt thereof.

2. The method of claim 1 in which the compound is administered to a mammal in need of said treatment at a daily dosage of from 5 to 500 mg.

3. The method of claim 1 in which the compound is administered to a mammal in need of said treatment in a unit dosage form, said compound being present to the extent of 1.25 to 250 mg. per unit dosage.

4. The method of claim 1 in which the compound is administered to a mammal in need of said treatment in a unit dosage form, said compound being present to the extent of 10 to 100 mg. per unit dosage.

5. A method of treating inflammation comprising topically applying to a mammal in need of said treatment, an anti-inflammatory effective amount of 4-hydroxynicotinic acid or a pharmaceutically acceptable salt thereof.

6. The method of claim 5 in which the compound is applied in a composition in which said compound is present in an amount of 1 to 20% by weight.

7. The method of claim 5, in which the compound is applied in a composition in which said compound is present in an amount of 2 to 10% by weight.

References Cited

Chemical Abstracts 65: 18557e (1966).

JEROME D. GOLDBERG, Primary Examiner